US00RE48849E

(19) United States
(12) Reissued Patent
Zhang et al.

(10) Patent Number: US RE48,849 E
(45) Date of Reissued Patent: Dec. 7, 2021

(54) MULTI-USER MIMO TRANSMISSIONS IN WIRELESS COMMUNICATION SYSTEMS

(71) Applicant: Samsung Electronics Co., Ltd., Suwon-si (KR)

(72) Inventors: Jianzhong Zhang, Plano, TX (US); Young-Han Nam, Plano, TX (US)

(73) Assignee: Samsung Electronics Co., Ltd., Suwon-si (KR)

(21) Appl. No.: 16/669,339

(22) Filed: Oct. 30, 2019

Related U.S. Patent Documents

Reissue of:
(64) Patent No.: Re. 47,338
Issued: Apr. 2, 2019
Appl. No.: 14/832,839
Filed: Aug. 21, 2015

Which is a Reissue of:
(64) Patent No.: 8,369,885
Issued: Feb. 5, 2013
Appl. No.: 12/753,364
Filed: Apr. 2, 2010

U.S. Applications:
(62) Division of application No. 14/276,750, filed on May 13, 2014, now Pat. No. Re. 46,161, which is an application for the reissue of Pat. No. 8,369,885.
(Continued)

(51) Int. Cl.
*H04B 7/00* (2006.01)
*H04W 56/00* (2009.01)
(Continued)

(52) U.S. Cl.
CPC ..... *H04W 56/0015* (2013.01); *H04W 52/242* (2013.01); *H04W 52/325* (2013.01);
(Continued)

(58) Field of Classification Search
CPC . H04W 52/16; H04W 52/146; H04W 52/325; H04W 52/326; H04W 52/345
See application file for complete search history.

(56) References Cited

U.S. PATENT DOCUMENTS

2008/0080560 A1 4/2008 Inoue et al.
2008/0107083 A1 5/2008 Shirota et al.
(Continued)

FOREIGN PATENT DOCUMENTS

CN 101287278 A 10/2008
JP 2013509739 3/2013
(Continued)

OTHER PUBLICATIONS

Ericsson, "Characterization of downlink control signaling for LTE-Advanced", TSG-RAN WG1 Meeting #56, Feb. 9-13, 2009, R1-090907, 6 pages.
(Continued)

*Primary Examiner* — Matthew E Heneghan

(57) ABSTRACT

An apparatus and method for providing control information in a Multi User-Multiple Input Multiple Output (MU-MIMO) wireless communication system is provided. The method includes receiving a plurality of Resource Elements (REs) including Downlink Control Information (DCI), determining, using the DCI, a set of REs to which a plurality of Downlink Reference Signals (DRSs) may be mapped, determining remaining REs as REs to which data is mapped, and demodulating the data using a precoding vector of a DRS corresponding to the MS.

24 Claims, 12 Drawing Sheets

Related U.S. Application Data

(60) Provisional application No. 61/212,659, filed on Apr. 14, 2009.

(51) Int. Cl.

| | |
|---|---|
| ***H04W 52/24*** | (2009.01) |
| ***H04W 72/04*** | (2009.01) |
| ***H04W 52/34*** | (2009.01) |
| ***H04W 52/32*** | (2009.01) |
| *H04L 1/18* | (2006.01) |
| *H04W 52/14* | (2009.01) |
| *H04L 1/00* | (2006.01) |
| *H04W 52/16* | (2009.01) |

(52) U.S. Cl.

CPC ..... *H04W 52/346* (2013.01); *H04W 72/0406* (2013.01); *H04L 1/0025* (2013.01); *H04L 1/1812* (2013.01); *H04W 52/146* (2013.01); *H04W 52/16* (2013.01)

(56) References Cited

U.S. PATENT DOCUMENTS

| | | | | |
|---|---|---|---|---|
| 2009/0088148 | A1 | 4/2009 | Chung et al. | |
| 2010/0014481 | A1 | 1/2010 | Ko et al. | |
| 2010/0195615 | A1* | 8/2010 | Lee et al. | 370/330 |
| 2010/0254471 | A1* | 10/2010 | Ko et al. | 375/260 |
| 2012/0034928 | A1* | 2/2012 | Wennstrom et al. | 455/450 |
| 2012/0057558 | A1* | 3/2012 | Prasad et al. | 370/329 |
| 2012/0213186 | A1 | 8/2012 | Ng et al. | |

FOREIGN PATENT DOCUMENTS

| | | | |
|---|---|---|---|
| KR | 20080054164 | A | 6/2008 |
| KR | 20090033001 | A | 4/2009 |
| RU | 2347320 | C2 | 2/2009 |
| WO | 2008/044882 | A1 | 4/2008 |
| WO | 2008/050964 | A1 | 5/2008 |
| WO | 2008072899 | A2 | 6/2008 |
| WO | 2008/115588 | A2 | 9/2008 |

OTHER PUBLICATIONS

Nokia et al., "DCI and CCE size", 3GPP TSG RAN WG1 Meeting #52bis, Mar. 31-Apr. 8, 2008, R1-081448, 8 pages.

Communication pursuant to Article 94(3) EPC dated Apr. 17, 2020 in connection with European Patent Application No. 10 764 645.7, 10 pages.

Samsung, "Discussion on Layer to DMRS mapping", 3GPP TSG RAN WG1 #60bis, Apr. 12-16, 2010, R1-102190, 3 pages.

Samsung, "Discussion on DL Traffic to Pilot Power Ratio with DMRS", 3GPP TSG RAN WG1 #60bis, Apr. 12-16, 2010, R1-102188, 5 pages.

Samsung, "Discussion on Layer to DMRS mapping", 3GPP TSG RAN WG1 #60, Feb. 22-26, 2010, R1-101154, 3 pages.

Motorola et al., "DRS EPRE", Change Request, 3GPP TSG-RAN Meeting #54, Aug. 18-22, 2008, R1-083247, 2 pages.

European Search Report dated Jan. 29, 2021 in connection with European Patent Application No. 20 20 3621, 14 pages.

Office Action dated Jun. 20, 2016 in connection with Japanese Application No. 2015-188766, 8 pages.

NEC Group, Downlink Control Signalling Support for SU/MU-MIMO, 3GPP TSG-RAN WGI Meeting #69, RI-094730, Jeju, Korea, Nov. 9-13, 2009, 7 pages.

Fujitsu, "Pseudo Transmission Timing Control Using Cyclic Shift for Downlink CoMP Joint Transmission", 3GPP TSG-RAN1 #56bis, R1-091502, Seoul, Korea, Feb. 23-27, 2009, 8 pages.

Motorola, "Control Signaling for Enhanced DL Transmission for LTE", 3GPP TSG RAN WG1 #58bis, R1-091339, Seoul, Korea, Mar. 23-27, 2009, 10 pages.

Office Action dated Feb. 5, 2016 in connection with Korean Patent Application No. 10-2011-7027023.

Chinese Office Action for Chinese Application No. 201510032514.X, dated Sep. 4, 2017. (13 pages).

* cited by examiner

MULTI-USER MIMO TRANSMISSIONS IN WIRELESS COMMUNICATION SYSTEMS

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue; a claim printed with strike-through indicates that the claim was canceled, disclaimed, or held invalid by a prior post-patent action or proceeding.

CROSS-REFERENCE TO RELATED APPLICATIONS

*Notice: More than one reissue application has been filed for the reissue of U.S. Pat. No. 8,369,885. The reissue applications are the present application,* which is a reissue of U.S. Pat. No. RE47,338 issued on U.S. Reissue patent application Ser. No. 14/832839, *which is a divisional reissue of U.S. Pat. No. 8,369,885, and U.S. patent application Ser. No. 14/276,750, which is an original reissue of U.S. Pat. No. 8,369,885 and which issued as U.S. Pat. No. RE46,161.* This application is a reissue of U.S. Pat. No. RE47,338, which *is a reissue divisional of U.S. patent application Ser. No. 14/276,750 filed May 13, 2014, which is an application for reissue of U.S. Pat. No. 8,369,885 issued Feb. 5, 2013 on U.S. patent application Ser. No. 12/753,364 filed Apr. 2, 2010, and* claims the benefit under 35 U.S.C. [§119(e)] *§ 119(e)* of U.S. Provisional Application No. 61/212,659 filed in the U.S. Patent and Trademark Office on Apr. 14, 2009, the entire disclosure of which is hereby incorporated by reference.

BACKGROUND OF THE INVENTION

1. Field of the Invention

The present invention relates to signaling in a Multi User-Multiple Input Multiple Output (MU-MIMO) wireless communication system. More particularly, the present invention relates to an apparatus and method for providing Downlink Control Information (DCI) in a MU-MIMO wireless communication system.

2. Description of the Related Art

The rapid growth of the wireless mobile communication market has resulted in a greater demand for various multimedia services in a wireless environment. Recently, to provide such multimedia services, which include a large amount of transmit data and increased data delivery rate, research is being conducted on Multiple Input Multiple Output (MIMO) wireless communication systems that provide a more efficient use of limited frequencies.

A MIMO wireless communication system can transmit a signal over independent channels per antenna and thus increase transmission reliability and data throughput without the use of an additional frequency or need for additional transmit power, as compared to a single-input single-output system. Furthermore, the MIMO wireless communication system can be extended to a MIMO system in a Multi User (MU) environment supporting a plurality of users. Such an MU-MIMO system enables the plurality of users to share spatial resources ensured by the multiple antennas, thus further improving the spectral efficiency.

In the next generation communication system employing MU-MIMO, research is actively in progress to provide a variety of Quality of Services (QoS) with a data transfer speed of about 100 Mbps. Representative examples of such communication systems include the Institute of Electrical and Electronics Engineers (IEEE) 802.16 system and the 3rd Generation Partnership Project (3GPP) Long Term Evolution (LTE) standard. Both the IEEE 802.16 system and the LTE standard employ Orthogonal Frequency Division Multiplexing (OFDM)/Orthogonal Frequency Division Multiple Access (OFDMA) scheme so that a broadband network can be supported in a physical channel.

FIGS. 1A and 1B illustrate a generic downlink frame structure used in a wireless communication system employing OFDM according to the related art.

Referring to FIG. 1A, the generic frame structure used in OFDM downlink includes a 10 ms radio frame 101 divided into 20 equal slots 103 of 0.5 ms. A sub-frame 105 consists of two consecutive slots such that one frame includes 10 sub-frames.

Referring to FIG. 1B, a generic structure of a resource grid for the duration of one downlink slot 103 is illustrated. The available downlink bandwidth consists of $N_{BW}^{DL}$ sub-carriers with a spacing of 15 kHz. The value of $N_{BW}^{DL}$ can vary in order to allow for scalable bandwidth operation up to 20 MHz. One downlink slot also consists of $N_{Symb}^{DL}$ symbols, each symbol including a Cyclic Prefix (CP) added as a guard time such that the value of $N_{Symb}^{DL}$ depends on the length of the CP. As illustrated in FIG. 1, the generic frame structure with normal CP length has $N_{Symb}^{DL}=7$ symbols.

In a wireless communication system employing OFDM technology, data is allocated to a Mobile Station (MS) using Resource Elements (REs) 107 of a resource block 109. As illustrated in FIG. 1B, a resource block 109 consists of 12 consecutive sub-carriers in the frequency domain and $N_{Symb}^{DL}$ consecutive symbols in the time domain. Depending on the required data rate, each MS can be assigned one or more resource blocks in each transmission interval of 1 ms (i.e., 2 slots or 1 sub-frame), the resource assignment being performed by a Base Station (BS). The user data is carried on a Physical Downlink Shared Channel (PDSCH) and the downlink control signaling, used to convey scheduling decisions to individual MSs, is carried on the Physical Downlink Control Channel (PDCCH). The PDCCH is located in the first OFDM symbols of a slot.

An aspect of the OFDM technology is the use of reference signals that are provided within the resource blocks for each MS. The reference signals are used by an MS for cell search, channel estimation, neighbor cell monitoring, mobility measurements, and the like. Moreover, the types of reference signals include a Cell-specific Reference Signal (CRS) and an MS specific reference signal, also known as a Dedicated Reference Signal (DRS).

FIGS. 2A through 2G illustrate downlink CRSs used in 1-antenna, 2-antenna and 4-antenna configurations according to the related art.

Referring to FIGS. 2A through 2G, pre-defined REs are used to carry the CRS sequences depending on the number of antennas. In the single antenna system illustrated in FIG. 2A, a CRS is placed in the RE associated with the #0 and #4 symbols of each slot in the time domain. In the frequency domain, the CRS is placed in the RE associated with each 6th subcarrier, there being a staggering of 3 subcarriers between symbols. In the two and four antenna systems of FIGS. 2B through 2G, CRSs are placed in REs in a fashion similar to that of the single antenna system, there being an offset of 3 subcarriers between CRSs for the different antennas. Moreover, with reference to the 2-antenna system (FIGS. 2B and 2C) and 4-antenna system (FIGS. 2D through 2G), REs used for CRS transmission of one antenna are not used for transmission on the other antenna(s).

FIG. 3 illustrates a downlink DRS for use in a wireless communication system employing OFDM technology according to the related art.

Referring to FIG. 3, a DRS pattern, indicated by elements ($R_5$), is illustrated in a pair of resource blocks along with unnumbered CRSs of a 4-antenna system. In contrast to the CRS, which uses 8 REs per resource block pair, the DRS uses 12 REs within the pair of resource blocks. The DRSs are supported for 1-antenna transmission of PDSCH and the MS is informed by a higher layer as to whether the DRS is present. Moreover, the DRS is transmitted only on the resource blocks upon which the corresponding PDSCH is mapped, the PDSCH and antenna port using the same pre-coding.

The downlink control signaling, used to convey scheduling decisions to individual MSs, is carried on the PDCCH, which is located in the first OFDM symbols of a slot. The information carried on the PDCCH is referred to as Downlink Control Information (DCI). Depending on the purpose of the control message, different formats of DCI are defined. More specifically, the 3GPP Technical Specification (TS) 36.212 defines various formats of DCI based on different needs of the communication system at the time of scheduling. For example, DCI Format 0 is used for the scheduling of a Physical Uplink Shared Channel (PUSCH), and DCI Format 1 is used for the scheduling of one PDSCH codeword. In TS 36.212, there are 10 DCI formats (i.e., formats 0, 1, 1A, 1B, 1C, 1D, 2, 2A, 3 and 3A), each DCI format including various information that may be used in conjunction with the reference signals for receiving data transmitted by the BS.

As the technology regarding wireless communication systems continue to advance, improvements are being made regarding transmission and reception of greater amounts of data. These improvements often require additional or different control information to be transmitted from a BS to an MS. Accordingly, there is a need for an improved apparatus and method for providing and using control information in a wireless communication system.

SUMMARY OF THE INVENTION

An aspect of the present invention is to address at least the above-mentioned problems and/or disadvantages and to provide at least the advantages described below. Accordingly, an aspect of the present the present invention is to provide an improved apparatus and method for providing and using control information in a Multi User-Multiple Input Multiple Output (MU-MIMO) mobile communication system.

According to an aspect of the present invention, a method for receiving a wireless communication signal by a Mobile Station (MS) is provided. The method includes receiving a plurality of Resource Elements (REs) including Downlink Control Information (DCI), determining, using the DCI, a set of REs to which a plurality of Downlink Reference Signals (DRSs) may be mapped, determining remaining REs as REs to which data is mapped, and demodulating the data using a precoding vector of a DRS corresponding to the MS.

According to yet another aspect of the present invention, a method for transmitting a wireless communication signal by a Base Station (BS) is provided. The method includes code division multiplexing a plurality of Dedicated Reference Signals (DRS) and mapping the multiplexed DRSs to one or more respective sets of Resource Elements (REs), mapping data to REs other than the one or more sets of REs, and transmitting a plurality of REs including the one or more sets of REs, the data REs, and REs comprising Downlink Control Information (DCI), wherein the DCI includes a spreading code used for the multiplexing of the DRSs.

According to still another aspect of the present invention, a method for receiving a wireless communication signal by a MS. The method including receiving a plurality of Resource Elements (REs) including Downlink Control Information (DCI), determining, using the DCI, one or more sets of REs to which a plurality of Downlink Reference Signals (DRSs) are mapped. determining remaining REs as REs to which data is mapped, despreading the data using a spreading index included in the DCI, and demodulating the data using a precoding vector of a DRS corresponding to the MS.

According to another aspect of the present invention, a method for receiving a wireless communication signal by an MS is provided. The method includes receiving a plurality of Resource Elements (REs) including Downlink Control Information (DCI), determining, using a downlink power offset field in the DCI, the number of Downlink Reference Signals (DRSs) mapped to respective REs, determining remaining REs as REs to which data is mapped, and demodulating the data using a precoding vector of a DRS corresponding to the MS.

According to another aspect of the present invention, a method for transmitting a wireless communication signal by a BS is provided. The method includes mapping a plurality of Dedicated Reference Signals (DRS) to respective Resource Elements (REs), mapping data to REs other than REs mapped to respective DRSs, and transmitting a plurality of REs including the REs mapped to respective DRSs, the data REs, and REs comprising Downlink Control Information (DCI), wherein the DCI includes a downlink power offset field indicating the number of DRSs mapped to respective REs.

According to still another aspect of the present invention, a method for controlling downlink power of a wireless communication signal by a BS is provided. The method includes determining a number of Dedicated Reference Signals (DRSs) transmitted by the BS, and determining a value of power offset using the determined number of DRSs.

According to yet another aspect of the present invention, a method for determining a power ratio of Resource Elements (REs) transmitted by an MS is provided. The method includes determining a type of modulation used for modulating the REs, if the type of modulation is determined to be one of Time Division Multiplexing (TDM) and Frequency Division Multiplexing (FDM), determining if the number of Dedicated Reference Signals (DRSs) transmitted by the BS is known, if the number of transmitted DRSs is known, setting the power ratio to correspond to the number of transmitted DRSs, and if the number of transmitted DRSs is not known, determining if the maximum number of DRSs that may be transmitted is known.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1A:
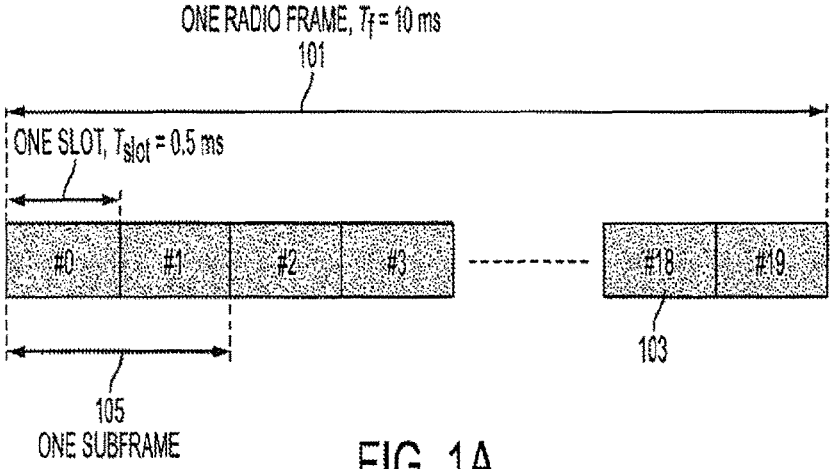
FIG. 1A RELATED ART
FIGS. 1A and 1B illustrate a generic downlink frame structure used in a wireless communication system employing Orthogonal Frequency Division Multiplexing (OFDM) according to the related art.
Figure 1B:
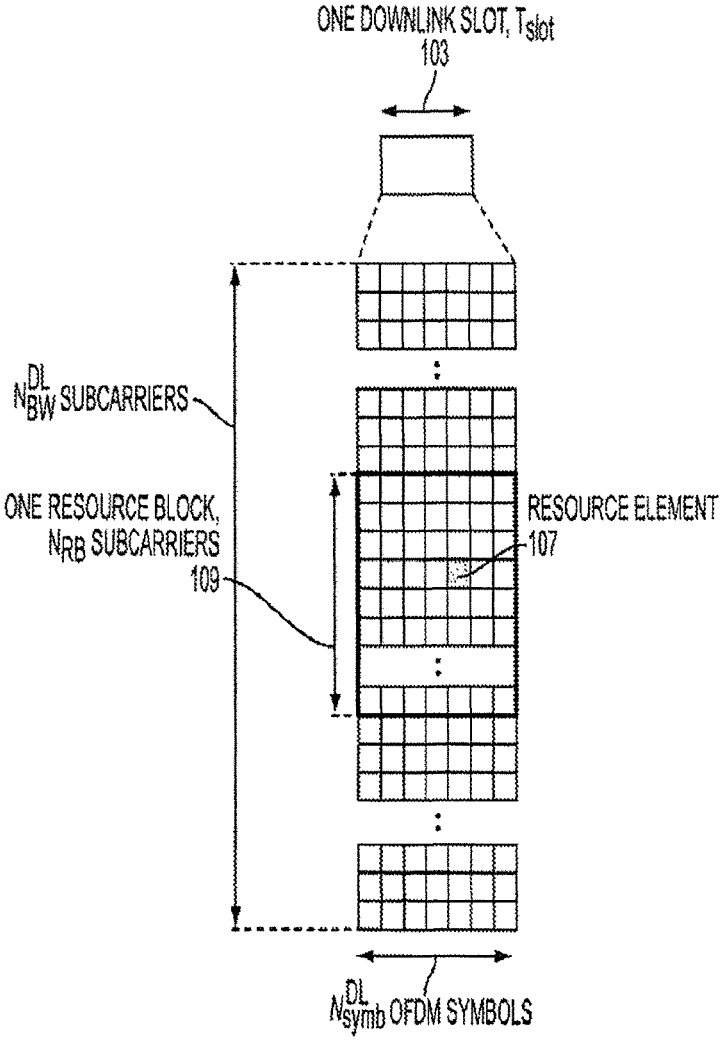
FIG. 1B RELATED ART
Figure 2A:
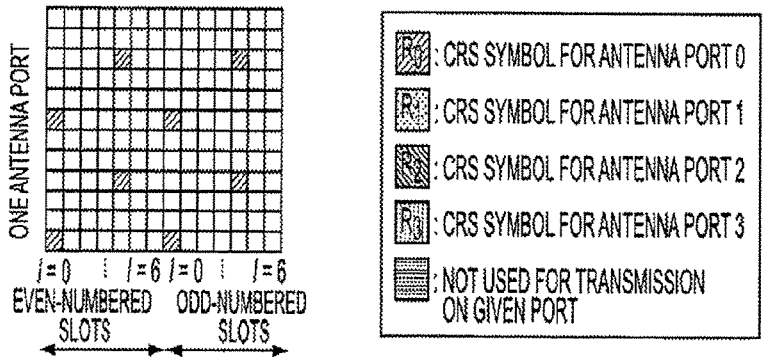
FIG. 2A RELATED ART
FIGS. 2A through 2G illustrate downlink Cell-specific Reference Signals (CRSs) used in 1-antenna, 2-antenna and 4-antenna configurations according to the related art.
Figure 2B:
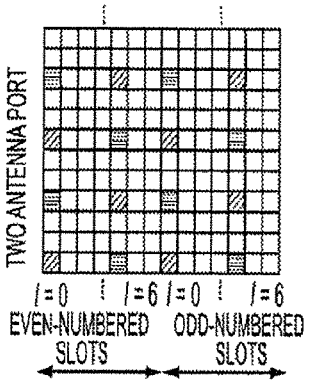
FIG. 2B RELATED ART
Figure 2C:
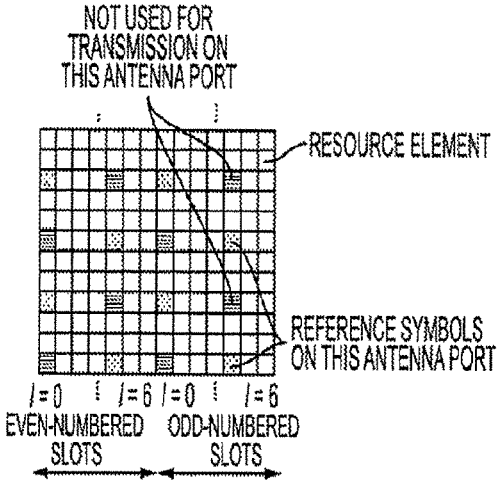
FIG. 2C RELATED ART
Figure 2D:
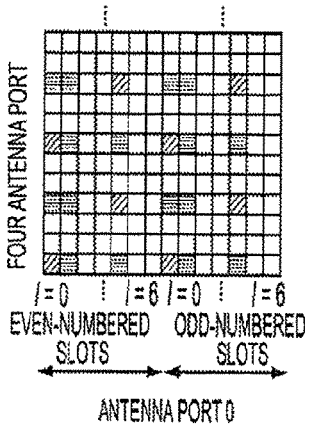
FIG. 2D RELATED ART
Figure 2E:
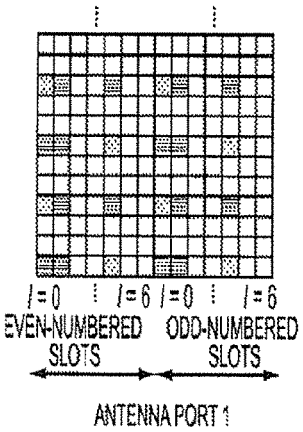
FIG. 2E RELATED ART
Figure 2F:
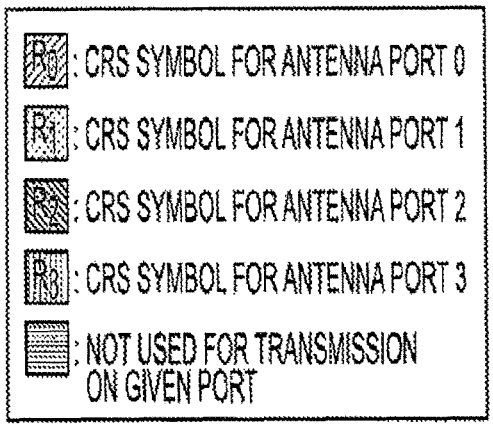
FIG. 2F RELATED ART
Figure 2F:
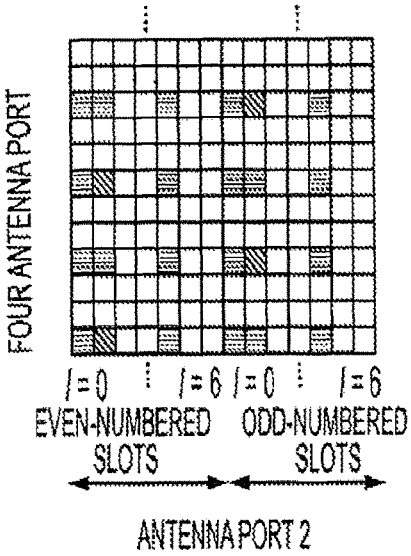
FIG. 2F RELATED ART
Figure 2G:
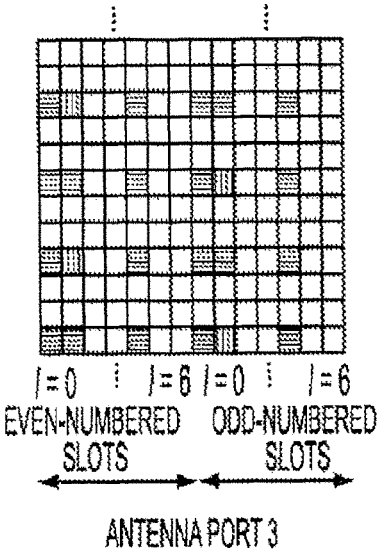
FIG. 2G RELATED ART
Figure 3:
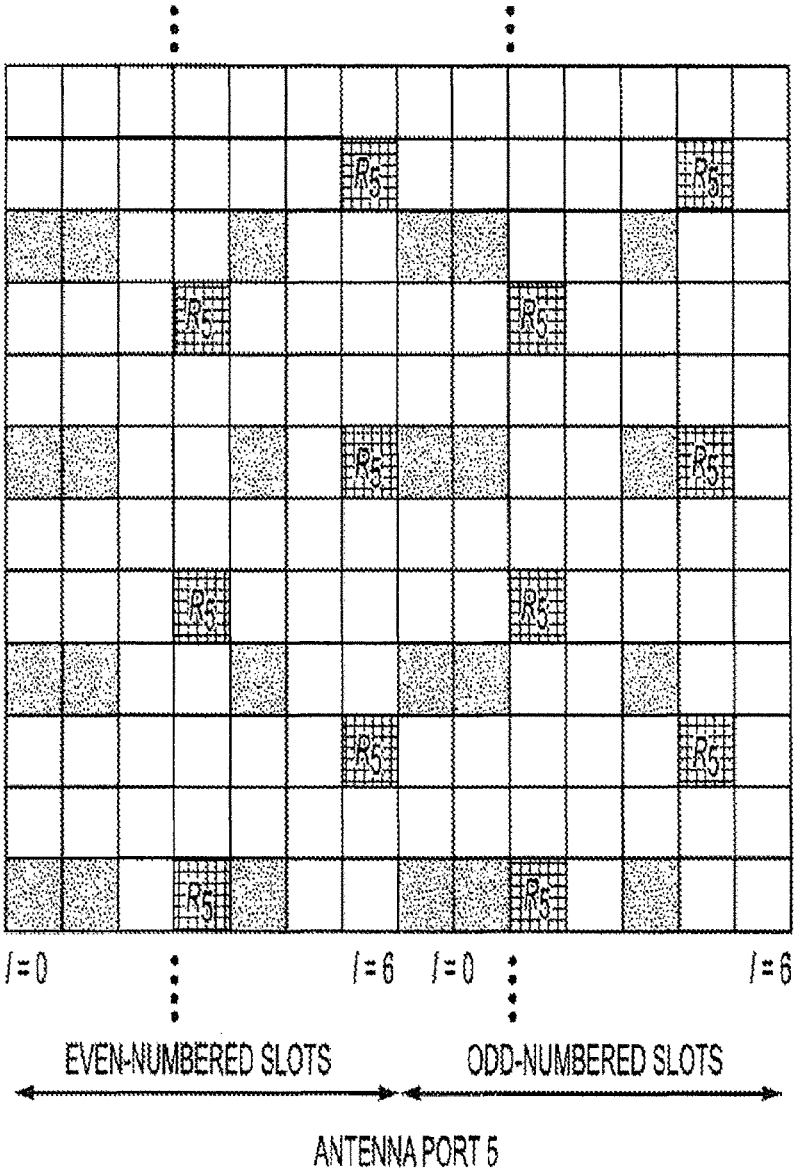
FIG. 3 RELATED ART
FIG. 3 illustrates a downlink Dedicated Reference Signal (DRS) for use in a wireless communication system employing OFDM technology according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for controlling operations of a Mobile Station (MS) when control information is received from a Base Station (BS). Additional exemplary embodiments of the present invention provide an improved format for control information provided by a BS to an MS. Yet further exemplary embodiments of the present invention provide an apparatus and method by a BS for controlling the power level used for transmitting control information to an MS.

The following description may refer to terminology that is specific to a certain mobile communication technology. However, this is not to be construed as limiting the application of the invention to that specific technology. For example, although terms such as User Equipment (UE) and evolved Node B (eNB), which are terms associated with the Long Term Evolution (LTE) communication standard, may be used in the following description, it is to be understood that these are merely specific terms for the generic concepts of an MS and a BS. That is, the present invention may be applied not only to systems employing the LTE standard, but equally to any communication system, such as a communication system employing the Institute of Electrical and Electronics Engineers (IEEE) 802.16m standard as well as the Worldwide Interoperability for Microwave Access (Wi-MAX) forum technologies.

Before an explanation is provided regarding exemplary embodiments of the present invention, a description of related art will be provided to assist in understanding various aspects of the present invention.

To facilitate Dedicated Reference Signal (DRS) based Multi User-Multiple Input Multiple Output (MU-MIMO) with single-layer data transmission, revised formats for Downlink Control Information (DCI) have been suggested. Specifically, U.S. provisional patent application 61/206,597, filed on Feb. 2, 2009, entitled "Multi-User Multi-Cell MIMO Transmissions in Wireless Communication Systems" and assigned to the assignee of the current application, the entire disclosure of which is hereby incorporated by reference, discloses therein a DCI format to address DRS based MU-MIMO single-layer transmission. As will be illustrated below, the proposed DCI format includes changes relative to DCI format 1D which is described in 3rd Generation Partnership Project (3GPP) Technical Specification (TS) 36.212.

Figure 4A:
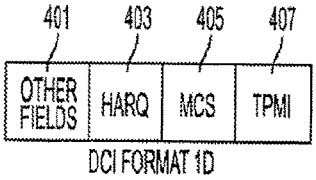
FIG. 4A RELATED ART
FIGS. 4A and 4B illustrate a comparison between format 1D of 3rd Generation Partnership Project (3GPP) Technical Specification (TS) 36.212 and a first proposed format for Downlink Control Information (DCI) according to the related art.

FIGS. 4A and B illustrate a comparison between format 1D of 3GPP TS 36.212 and a first proposed format for DCI according to the related art.

Figure 4B:
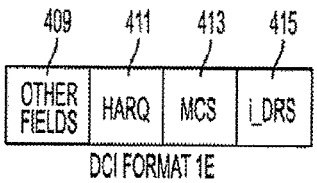
FIG. 4B RELATED ART

Referring to FIG. 4A, DCI format 1D includes a Hybrid Automatic Repeat reQuest (HARQ) field 403, a Modulation and Coding Scheme (MCS) field 405, a Transmitted Precoding Matrix Indicator (TPMI) field 407, and other fields 401. Referring to FIG. 4B, the DCI format proposed in provisional application 61/206,597, which is here designated as DCI format 1E, includes an HARQ field 411, an MCS field 413, and other fields 409. In distinction from DCI format 1D, DCI format 1E does not include a TPMI field and introduces a field regarding the index of the DRS (i_DRS) 415 used in the relevant transmission. The i_DRS field 415 indicates which DRS in the system is to be used by the MS receiving the DCI. The bitwidth of the i_DRS field depends on the maximum number of DRSs allowed in the MU-MIMO system. This maximum allowed DRS number is denoted by M, such that the bitwidth of i_DRS is $\lceil \log, M \rceil$. The value of M is either fixed in the standard or signaled by the BS as a cell-specific value. In an exemplary implementation, the value of M may be provided in a broadcast channel.

Use of the proposed DCI format 1E results in the following actions by the BS and the MS. If the DCI format 1E is used by the BS during a Scheduling Assignment (SA) for MU-MIMO transmission, in the data to Resource Element (RE) mapping step performed by the BS, the BS transmits data on REs other than the set of DRS REs indicated by the index i_DRS. Upon receipt of the DCI format 1E, the MS will assume that the set of DRS REs indicated by i_DRS are precoded using the same precoding vector as the data layer, and therefore may be used as a demodulation pilot for the data layer. The MS will also assume that the BS data is mapped to the REs other than the set of DRS REs indicated by the index i_DRS. Furthermore, the MS will assume that the BS data is mapped to REs other than any Cell-specific Reference Signals (CRSs) used in the transmission. The following example assists in understanding use of the DCI format 1E with DRS patterns defined by a system.

Figure 5:
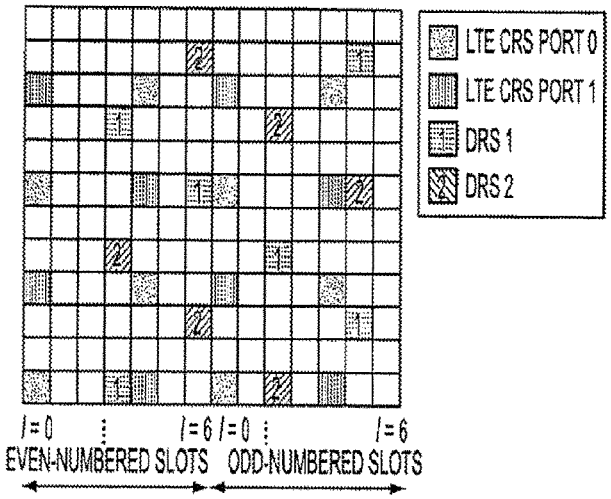
FIG. 5 RELATED ART
FIG. 5 illustrates the use of two downlink DRSs in a wireless communication system employing 2-antennas and using the proposed DCI format 1E according to the related art.
Figure 6A:
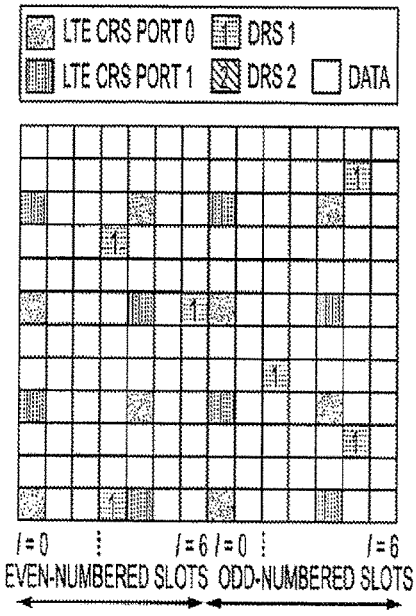
FIG. 6A RELATED ART
FIGS. 6A and 6B illustrate individual Mobile Station (MS) behavior upon receipt of the proposed DCI format 1E according to the related art.
Figure 6B:
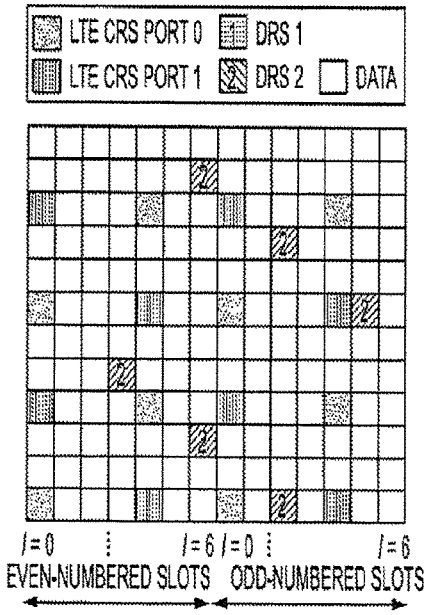
FIG. 6B RELATED ART

FIG. 5 illustrates the use of two downlink DRSs in a wireless communication system employing 2-antennas and using the proposed DCI format 1E according to the related art. FIGS. 6A and 6B illustrate individual MS behavior upon receipt of the proposed DCI format 1E according to the related art.

Referring to FIG. 5, it is assumed that M=2 (i.e., there are 2 DRS patterns specified in the system) and that there are two CRSs (i.e., CRS1 and CRS2) in the Resource Block (RB). Furthermore, it is assumed that two MSs are schedule in a sub-frame (e.g., MS#1 and MS#2) such that for MS#1, i_DRS=1 meaning that the first DRS pattern, DRS(1), is used for MS#1. Similarly, for MS#2. i_DRS=2 meaning that the second DRS pattern, DRS(2), is used for MS#2.

Referring to FIGS. 6A and 6B, FIG. 6A illustrates the observations of MS#1 while FIG. 6B illustrates the observations of MS#2. As illustrated in FIG. 6A, MS#1 only recognizes DRS(1) as a pilot RE and recognizes other REs (other than CRS1, CRS2 and DRS(1)) as data REs. Similarly, MS#2 as illustrated in FIG. 6B only recognizes DRS (2) as a pilot RE and recognizes other REs (other than CRS1, CRS2 and DRS(2)) as data REs. The drawback of this approach is that MS#1 will transmit data on the REs where DRS(2) occurs. Similarly, MS#2 will transmit data on the REs where DRS(1) occurs. Such transmissions by the MSs will create interference between the data REs of one MS and the DRS of the other MS.

Figure 7A:
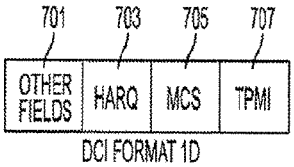
FIG. 7A RELATED ART
FIGS. 7A and B illustrate a comparison between format 1D of 3GPP TS 36.212 and a second proposed format for DCI according to the related art.
Figure 7B:
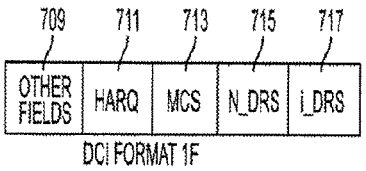
FIG. 7B RELATED ART

FIGS. 7A and 7B illustrate a comparison between format 1D of 3GPP TS 36.212 and a second proposed format for DCI according to the related art.

Referring to FIGS. 7A and 7B, FIG. 7A illustrates DCI format 1D which includes an HARQ field 703, an MCS field 705, a TPMI field 707, and other fields 701. Referring to FIG. 7B, a second DCI format proposed in provisional application 61/206,597 and here designated as DCI format 1F, includes an HARQ field 711, an MCS field 713, and other fields 709. In distinction from DCI format 1D, DCI format 1F does not include a TPMI field and introduces two fields. Similar to the proposed DCI format 1E, DCI format 1F introduces a field indicating the index of the DRS (i_DRS) 717 used in this transmission. The i_DRS field 717 indicates which DRS in the system is to be used by the MS receiving the DCI. The bitwidth of the i_DRS field depends on the maximum number of DRSs allowed in the MU-MIMO system. This maximum allowed DRS number is denoted by M, such that the bitwidth of i_DRS is $\lceil \log_2 M \rceil$. The value of M is either fixed in the standard or signaled by the BS as a cell-specific value. In an exemplary implementation, the value of M may be provided in a broadcast channel.

The proposed DCI format 1F also introduces a field that indicates the total number of DRSs (N_DRS) 715 in the scheduled band. More specifically, the field N_DRS indicates the total number of DRSs in the scheduled band which includes the DRSs used for this MS and other MSs scheduled in the same band in this particular sub-frame. The bitwidth of the N_DRS field is also $\lceil \log_2 M \rceil$, and the value range of N_DRS is $1 \leq N_DRS \leq M$.

Once an MS receives N_DRS and i_DRS, it expects that the set of DRSs (i.e., DRS(1), DRS(2) . . . DRS(N_DRS)) is used for transmitting data to multiple users in this sub-frame. In addition, the MS expects DRS(i_DRS) is used as a reference signal to demodulate its own data.

More specifically, use of the prolonged DCI format 1F results in the following actions by the BS and the MS. The MS assumes that the DRS RE indicated by i_DRS is precoded using the same precoding vector as the data layer and can therefore be used as a demodulation pilot for the data layer. In addition, if the DCI format 1F is used by the BS during an SA for MU-MIMO transmission, in terms of avoiding DRS REs in the data to RE mapping step of BS transmission, there are at least three alternatives.

In alternative 1, the BS transmits data on REs other than the sets of DRS REs indicated by (DRS(1), . . . , DRS (N_DRS)). At the MS, the MS will assume the BS data is mapped to the REs other than the set of DRS REs indicated by the set (DRS(1), . . . DRS(N_DRS)).

In alternative 2, similar to the actions regarding transmission of DCI format 1D, the BS transmits data on REs other than the set of DRS REs indicated by the index i_DRS. At the MS, the MS will assume the BS data is mapped to the REs other than the set of DRS REs indicated by the index i_DRS.

In alternative 3, the MS receives a cell-specific or MS-specific switch, configured by the BS using higher layers, denoted by DRS_region_switch. In this case, if DRS_region_switch=0, then the MS assumes that the BS data is mapped to the REs other than the set of DRS REs indicated by the set (DRS(1), . . . DRS(N_DRS)). On the other hand, if DRS_region_switch=1, then the MS assumes that the BS data is mapped to the REs other than the set of DRS REs indicated by the index DRS(i_DRS). An example is provided to assist in understanding use of the DCI format 1F.

Figure 8A:
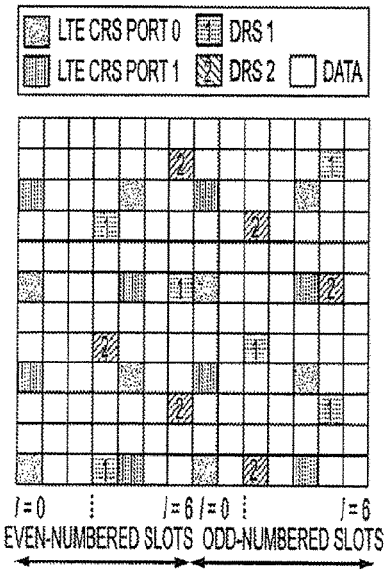
FIG. 8A RELATED ART
FIGS. 8A and B illustrate individual MS behavior upon receipt of the proposed DCI format 1F according to the related art.
Figure 8B:
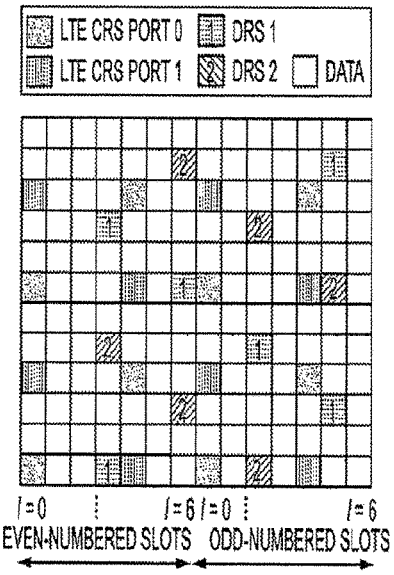
FIG. 8B RELATED ART

FIGS. 8A and 8B illustrate individual MS behavior upon receipt of the proposed DCI format 1F according to the related art.

Referring again to FIG. 5, it is assumed that M=2, and that 2 DRS patterns and two CRS patterns are used in the RB. It is also assumed that alternative 1 of data to RE mapping approach is use by the BS. Furthermore, it is assumed that two MSs are scheduled in a sub-frame (i.e., MS#1 and MS#2) such that for MS#1, N_DRS=2 and i_DRS=1, meaning that the first DRS patterns, DRS(1), is used for MS#1. Also, for MS#2, N_DRS=2 and i_DRS=2, meaning that the second DRS pattern, DRS(2), is used for MS#2.

Referring to FIG. 8A, MS#1 only recognizes DRS(1) as a pilot RE and recognizes other REs (other than CRS1, CRS2, DRS(1), and DRS(2)) as data REs. Referring to FIG. 8B, MS#2 only recognizes DRS(2) as a pilot RE and recognizes other REs (other than CRS1, CRS2, DRS(1), and DRS(2)) as data REs. Compared to the approach illustrated in FIGS. 6A and 6B, this approach does not suffer from the interference caused by one MS's DRS and another MS's data.

Figure 9A:
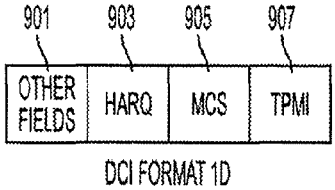
FIG. 9A RELATED ART
FIGS. 9A and B illustrate a comparison between format 1D of 3GPP TS 36.212 and a third proposed format for DCI according to the related art.
Figure 9B:
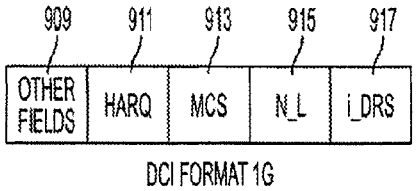
FIG. 9B RELATED ART
Figure 10:
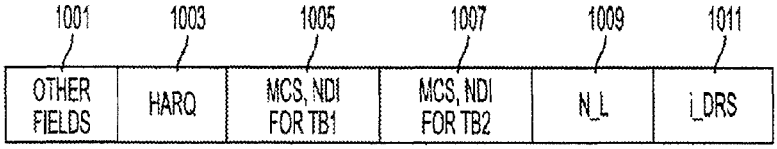
FIG. 10 RELATED ART
FIG. 10 illustrates a fourth proposed format for DCI according to the related art.

FIGS. 9A and 9B illustrate a comparison between format 1D of 3GPP TS 36.212 and a third proposed format for DCI according to the related art. FIG. 10 illustrates a fourth proposed format for DCI according to the related art.

Referring to FIG. 9A, DCI format 1D includes an HARQ field 903, an MCS field 905, a TPMI field 907, and other fields 901. Referring to FIG. 9B, the third DCI format proposed in provisional application 61/206,597 and here designated as DCI format 1G includes an HARQ field 911, an MCS field 913, and other fields 909. In distinction from DCI format 1D, DCI format 1G does not include a TPMI field and introduces two fields. Similar to the proposed DCI formats 1E and 1F, DCI format 1G introduces a field indicating the index of the DRS (i_DRS) 917 used in the relevant transmission. The i_DRS field 917 indicates which DRS in the system is to be used by the MS receiving the DCI. The bitwidth of the i_DRS field depends on the maximum number of DRSs allowed in the MU-MIMO system. This maximum allowed DRS number is denoted by M, such that the bitwidth of i_DRS is $\lceil \log_2 M \rceil$. The value of M is either fixed in the standard or signaled by the BS as a cell-specific value. In an exemplary implementation, the value of M may be provided in a broadcast channel.

The proposed DCI format 1G also introduces a field that indicates the Number of Layers (N_L) 915 in the relevant transmission to the MS. Accordingly, by using the proposed format 1G, the BS conveys (1) how many layers are used for data transmission, and (2) the corresponding DRSs for these layers. Furthermore, in DCI format 1G, it is assumed that one codeword is transmitted from the BS to the MS, regardless of the number of layers used in the transmission.

If the DCI format 1G is used by the BS during an SA for MU-MIMO transmission, in the data to RE mapping step, the BS transmits data on REs other than the set of DRS REs indicated by the set of consecutive DRS patterns (DRS (i_DRS), . . . , DRS(i_DRS+N_L)). Upon receipt of this transmission. the MS will assume that the set of REs indicated by DRS(i_DRS) is precoded using the same precoding vector as the data layer #1, and therefore can be used as a demodulation pilot for data layer #1. Similarly, DRS (i_DRS+1) is used to demodulate layer #2, . . . , DRS (i_DRS+N_L) is used to demodulate layer #N_L. The MS will also assume that the BS data is mapped to the REs other than the set of DRS REs indicated by the index (DRS (i_DRS), . . . DRS(i_DRS+N_L)).

Referring to FIG. 10, as a variation of format 1G, if up to two codewords are used in the MU-MIMO, DCI format 2G is also proposed in provisional application 61/206,597. As illustrated in FIG. 10, the proposed DCI format 2G includes an HARQ field 1003, an N_L field 1009, an i_DRS field 1011 and other fields 1001. The N_L field 1009 and i_DRS field 1011 are substantially the same as those proposed in DCI format 1G. However, as illustrated in FIG. 10, there are two sets of MCS fields 1005 and 1007, each corresponding to a given Transport Block (TB), respectively related to the two codewords.

Figure 11A:
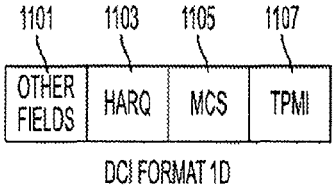
FIG. 11A RELATED ART
FIGS. 11A and B illustrate a comparison between format 1D of 3GPP TS 36.212 and a fifth proposed format for DCI according to the related art.
Figure 11B:
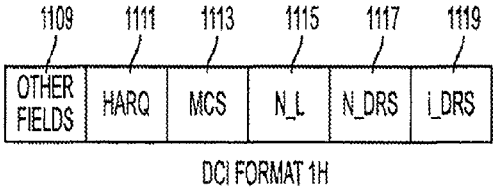
FIG. 11B RELATED ART
Figure 12:
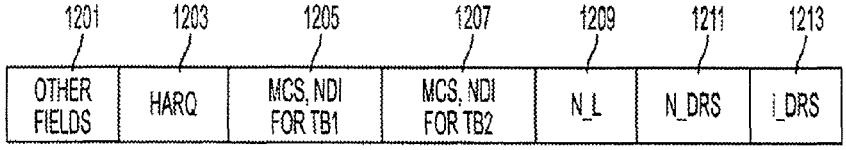
FIG. 12 RELATED ART
FIG. 12 illustrates a sixth proposed format for DCI according to the related art.

FIGS. 11A and 11B illustrate a comparison between format 1D of 3GPP TS 36.212 and a fifth proposed format for DCI according to the related art. FIG. 12 illustrates a sixth proposed format for DCI according to the related art.

Referring to FIG. 11A, DCI format 1D includes an HARQ field 1103, an MCS field 1105, a TPMI field 1107, and other fields 1101. Referring to FIG. 11B, the fifth DCI format proposed in provisional application 61/206,597 and here designated as DCI format 1H, includes an HARQ field 1111, an MCS field 1113, and other fields 1109. In distinction from DCI format 1D, DCI format 1H does not include a TPMI field and introduces three fields. Similar to the proposed DCI formats 1E, 1F, and 1G, DCI format 1H introduces a field indicating the index of the DRS (i_DRS) 1119 used in this transmission. The i_DRS field 1119 indicates which DRS in the system is to be used by the MS receiving the DCI. The bitwidth of the i_DRS field 1119 depends on the maximum number of DRSs allowed in the MU-MIMO system. This maximum allowed DRS number is denoted by M, such that the bitwidth of i_DRS is $\lceil \log, M \rceil$. The value of M is either fixed in the standard or signaled by the BS as a cell-specific value. In an exemplary implementation, the value of M may be provided in a broadcast channel.

The proposed DCI format 1H also introduces a field that indicates the number of layers (N_L) 1115 in the transmission to this MS and introduces a field that indicates the total number of DRSs (N_DRS) 1117 in the scheduled band. More specifically, the field N_DRS 1117 indicates the total number of DRSs in the scheduled band which includes the DRSs used for this MS and other MSs scheduled in the same band in this particular sub-frame. The bitwidth of the N_DRS field 1117 is also $\lceil \log, M \rceil$, and the value range of N_DRS is $1 \leq N_DRS \leq M$.

In DCI format 1H, it is assumed that one codeword is transmitted from the BS to the MS, regardless of number of layers used in the transmission.

If the DCI format 1H is used by the BS during an SA for MU-MIMO transmission, the MS shall assume that the set of REs indicated by DRS(i_DRS) is precoded using the same precoding vector as the data layer #1, and can therefore be used as a demodulation pilot for data layer #1. Similarly, DRS(i_DRS+1) can be used to demodulate layer #2, . . . , DRS(i_DRS+N_L) can be used to demodulate layer #N_L. In addition, in terms of avoiding DRS REs in the data to RE mapping step during BS transmission, there are at least three alternatives.

In alternative 1, the BS transmits data on REs other than the sets of DRS REs indicated by the set (DRS(1), . . . , DRS(N_DRS)). The MS will assume the BS data is mapped to the REs other than the set of DRS REs indicated by the set (DRS(1), . . . DRS(N_DRS)).

In alternative 2, similar to the case in DCI format 1G, the BS transmits data on REs other than the set of DRS REs indicated by the set (DRS(i_DRS), . . . , DRS(i_DRS+N_L)). The MS will assume that the BS data is mapped to the REs other than the set of DRS REs indicated by the set (DRS(i_DRS), . . . , DRS(i_DRS+N_L)).

In alternative 3, the MS receives a cell-specific or MS-specific switch configured by the BS using higher layers and denoted as DRS_region_switch. If DRS_region_switch=0, then the MS assumes that BS data is mapped to the REs other than the set of DRS REs indicated by the set (DRS(1), . . . DRS(N_DRS)). On the other hand, if DRS_region_switch=1, then the MS assumes that BS data is mapped to the REs other than the set of DRS REs indicated by the index set (DRS(i_DRS), . . . , DRS(i_DRS+N_L)).

Referring to FIG. 12, as a variation of format 1H, if up to two codewords are used in the MU-MIMO, DCI format 2H is also proposed in provisional application 61/206,597. As illustrated in FIG. 12, the proposed DCI format 2H includes an HARQ field 1203, an N_L field 1209, an N_DRS field 1211, an i_DRS field 1213 and other fields 1201. The N_L field 1209, N_DRS field 1211 and i_DRS field 1213 are substantially the same as those proposed in DCI format 1H. However, as illustrated in FIG. 12, there are two sets of MCS fields 1205 and 1207, each corresponding to a given TB.

First Exemplary Embodiment

In a first exemplary embodiment of the present invention, an alternative method is provided for use of DCI format 1E. More specifically, an alternative BS-MS behavior for the case in which the BS uses the DCI format 1E for SA when the MSs are configured in MU-MIMO transmission mode is provided. In an exemplary implementation, Frequency Division Multiplexing (FDM) or Time Division Multiplexing (TDM) is used for the DRS pattern in a wireless communication system. In another exemplary implementation, Code Division Multiplexing (CDM) is used for the DRS pattern.

Figure 13A:
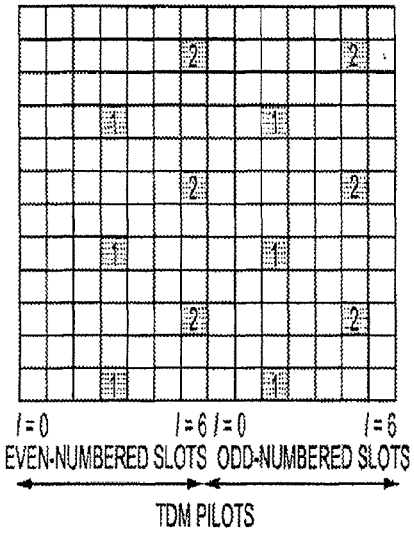
FIGS. 13A through 13C illustrate dual layer RS patterns for systems using Frequency Division Multiplexing (FDM), Time Division Multiplexing (TDM) and Code Division Multiplexing (CDM) according to an exemplary embodiment of the present invention.
Figure 13B:
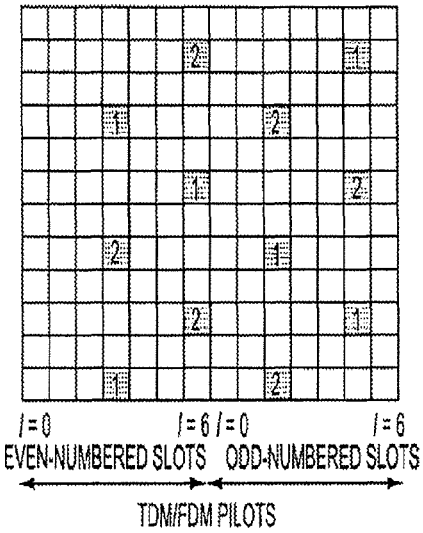
Figure 13C:
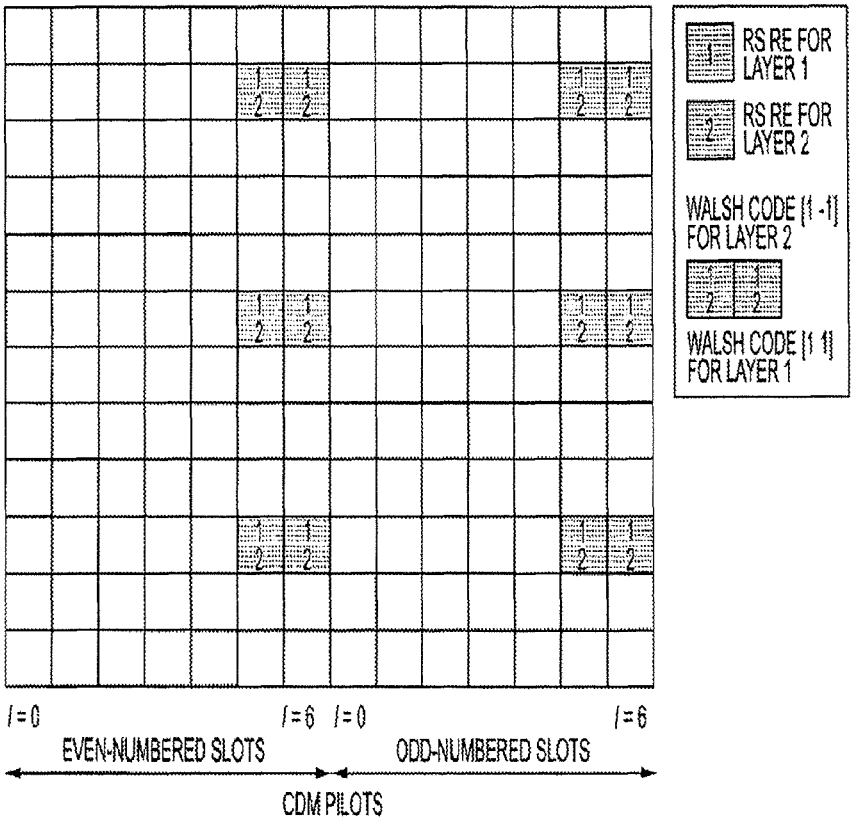

FIGS. 13A through 13C illustrate dual layer RS patterns for systems using FDM, TDM, and CDM according to an exemplary embodiment of the present invention.

Referring to FIG. 13A, RS patterns for a system using TDM signals is illustrated. Referring to FIG. 13B, RS patterns for a system using TDM/FDM signals are illustrated. Referring to FIG. 13C, RS patterns for a system using CDM signals are illustrated.

If the DCI format 1E is used by the BS during SA for MU-MIMO transmission, in the data to RE mapping step performed by the BS, the BS transmits data on REs other than the set of all M DRS REs. Upon receipt of the transmission, the MS assumes that the set of DRS REs indicated by i_DRS are precoded using the same precoding vector as the data layer, and therefore may be used as a demodulation pilot for the data layer. The MS also assumes that the BS data is mapped to the REs other than those used by all M DRSs, where M is the maximum number of DRSs indicated by the higher layer semi-statically. An exemplary implementation of this method is illustrated below.

Figure 14A:
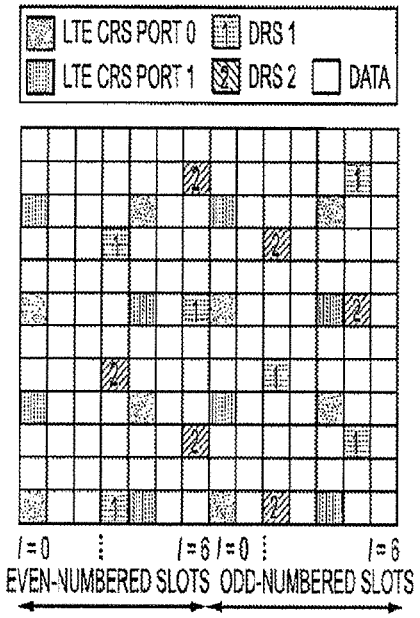
FIGS. 14A and B illustrate a downlink DRS pattern in a wireless communication system according to an exemplary embodiment of the present invention.
Figure 14B:
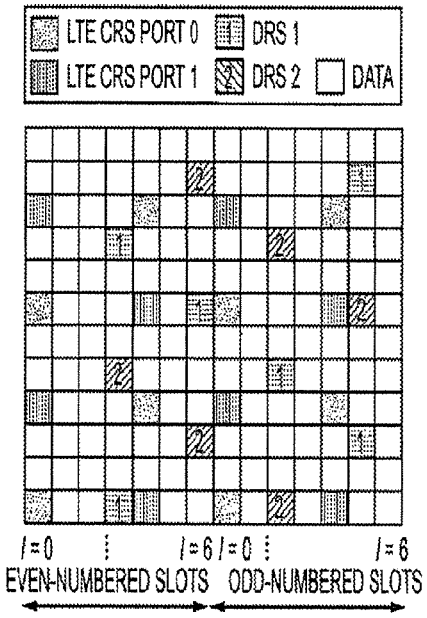

FIGS. 14A and 14B illustrate a downlink DRS pattern in a wireless communication system according to an exemplary embodiment of the present invention.

Referring to FIG. 14A, an MS#1 only sees DRS(1) as a pilot RE. However, the data REs seen by MS#1 will exclude both DRS(1) and DRS(2). Referring to FIG. 14B, MS#2 only sees DRS(2) as a pilot RE. However, the data REs seen by MS#2 will exclude both DRS(1) and DRS(2), as well as any CRS. In the illustrated example of FIGS. 14A and 14B, the maximum number of DRSs (M) is 2 so that the results are similar to those illustrated in the related art of FIG. 8. However, the exemplary implementation of FIGS. 14A and 14B illustrates use of DCI format 1E, rather than proposed DCI format 1F of FIGS. 8A and 8B. As shown above, DCI format 1E does not include the field N_DRS as required in DCI format 1F and thus does not require the additional overhead of DCI format 1F. Moreover, by assuming that data is mapped to all REs other than those used by the maximum number M of DRS REs, the MS is able to more efficiently receive and demodulate the data.

In an exemplary implementation, the wireless communication system may employ a CDM DRS pattern similar to that illustrated in FIG. 13C. If such a CDM pattern is applied, then both DRS(1) and DRS(2) occupy the same set of REs. In this example, since M=2, both DRSs are CDMed together. Therefore, the MS and BS behavior are substantially the same as above, except that the MS needs to process the additional step of de-spreading to determine a channel estimate. To accomplish this, it is noted that in the DCI format 1E, the field i_DRS continues to indicate the index of DRS, while in the case of CDM DRS (or hybrid CDM/FDM (DRS)) the i_DRS also indicates the spreading Walsh code being used by the BS. Notably, using i_DRS to indicate both DRS location and spreading code is applicable for any of DCI formats 1E, 1F, 1G, 2G, 1H and 2H, as long as a CDM or a hybrid CDM/FDM scheme is used.

As an example of the present invention, it is assumed that the DCI format 1E is used by the BS during SA for MU-MIMO transmission, and all M DRSs are using a CDM pattern as shown in FIG. 13C. In the data to RE mapping performed by the BS during transmission, the BS transmits data on REs other than the entire set of DRS REs. In response, the MS assumes that the DRS is precoded using the same precoding vector as the data layer, and spread onto the resources according to the Walsh index indicated by i_DRS. Furthermore, the MS will assume the BS data is mapped to the REs other than those used by the entire set of M DRSs, where M is the maximum number of DRS indicated by a higher layer semi-statically.

Second Exemplary Embodiment

In a second exemplary embodiment of the present invention, an alternative method is provided for use of DCI format 1F in the case of a hybrid CDM/FDM DRS pattern.

Figure 15:
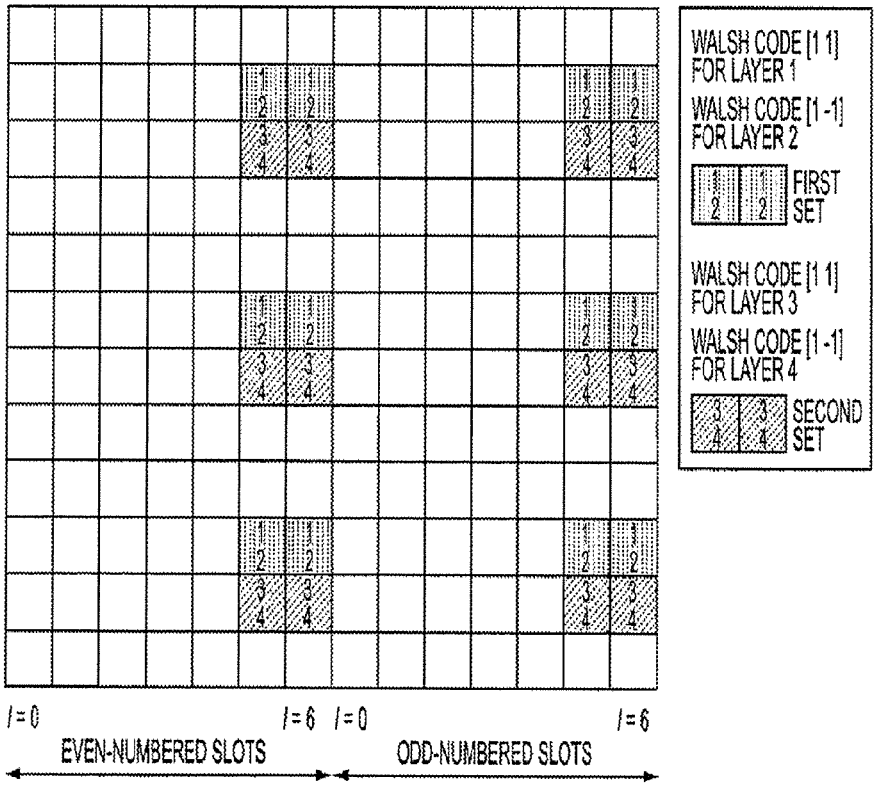
FIG. 15 illustrates a hybrid CDM/FDM DRS pattern according to an exemplary embodiment of the present invention.

FIG. 15 illustrates a hybrid CDM/FDM DRS pattern according to an exemplary embodiment of the present invention.

Referring to FIG. 15, DRS(1) and DRS(2) share the same first set of REs using length 2 Walsh spreading, while DRS(3) and DRS(4) share the same second set of REs also using length 2 Walsh spreading.

In an exemplary method according to the present invention, the MS assumes that the DRS RE indicated by i_DRS is precoded using the same precoding vector as the data layer, and therefore may be used as a demodulation pilot for the data layer. In addition. in terms of avoiding DRS RE in the data to RE mapping step performed by the BS during transmission, the BS transmits data on REs other than the sets of DRS REs indicated by (DRS(1), . . . , DRS(N_DRS)). Upon receipt of the transmission from the BS, the MS will assume that the BS data is mapped to the REs other than the DRS REs indicated by the set (DRS(1), . . . DRS(N_DRS)).

Furthermore, since a hybrid CDM/FDM is assumed, the i_DRS in DCI format 1F also indicates the spreading Walsh code used by the BS to spread the i_DRS.

As another example, it is considered that four MSs are scheduled by the BS, and that each MS has a rank-1 transmission. It is also assumed that the DRS pattern in FIG. 15 is used by the system. In this case, the MS#1-MS#4 have the following behavior:

1) Each MS will assume that data REs do not include CRS or DRS REs;
2) For MS#1 and MS#2, the first set of DRSs is used for demodulation, whereas MS#1 will use Walsh code [1,1] to de-spread the first set of DRS, while the MS#2 will use Walsh code [1,−1] to de-spread the first set of DRS; and
3) For MS#3 and MS#4, the second set of DRS is used for demodulation, whereas MS#3 will use Walsh code [1,1] to de-spread the second set of DRS, while the MS#4 will use Walsh code [1,−1] to de-spread the second set of DRS.

Third Exemplary Embodiment

Figure 16A:
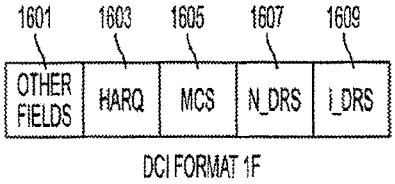
FIGS. 16A and B illustrate a DCI format according to an exemplary embodiment of the present invention.
Figure 16B:
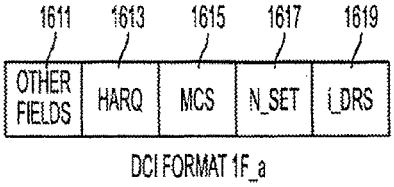

FIGS. 16A and 16B illustrate a DCI format according to an exemplary embodiment of the present invention.

Referring to FIG. 16A, DCI format 1F which includes an HARQ field 1603, an MCS field 1605, an N_DRS field 1607, an i_DRS field 1609, and other fields 1601 is illustrated. Referring to FIG. 16B, a DCI format according to an exemplary embodiment of the present invention and here designated as DCI format 1F_a, includes an HARQ field 1613, an MCS field 1615, an i_DRS field 1619 and other fields 1611. In distinction from DCI format 1F, DCI format 1F_a does not include an N_DRS field and introduces a new field. More specifically, in DCI format 1F_a, the N_DRS field proposed in DCI format 1F, is replaced with a field that indicates the total number of DRS sets (N_SET) 1617 used in the transmission of a sub-frame.

According to an exemplary implementation using DCI format 1F_a, in each set, CDM is used to multiplex N_SF DRSs, where N_SF denotes the spreading length. For a hybrid CDM/FDM DRS pattern such as illustrated in FIG. 15, using the N_SET field reduces the number of bits used in the DCI format 1F_a as compared to use of the N_DRS field. For example, as illustrated FIG. 15, only two states of N_SET are needed. That is, N_SET may have a state in which N_SET=1 (indicating only the first set of DRSs is used) or N_SET=2 (indicating both sets of DRSs are used). Because there are only two states, the state status can be reflected with only a single bit in DCI format 1F_a. In contrast, the N_DRS field of DCI format 1F must reflect four possible states (i.e., N_DRS=1, 2, 3, 4), which requires 2 bits to reflect the N_DRS state status in DCI format 1F. Accordingly, use of DCI format 1F_a reduces overhead when transmitting control information.

In alternative exemplary embodiments, other DCI formats, such as 1H and 2H, may replace the N_DRS field with the N_SET field of the present invention.

Fourth Exemplary Embodiment

Figure 17A:
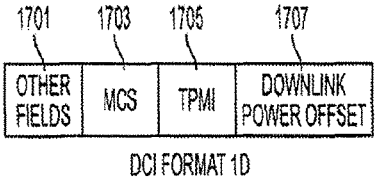
FIG. 17A RELATED ART
FIGS. 17A and B illustrate a DCI format according to an exemplary embodiment of the present invention.
Figure 17B:
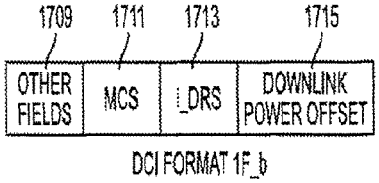

FIGS. 17A and 17B illustrate a DCI format according to an exemplary embodiment of the present invention.

Referring to FIG. 17A, DCI format 1D which includes an MCS field 1703, a Transmitted Precoding Matrix Indicator (TPMI) field 1705, a Downlink power offset field 1707, and other fields 1701 is illustrated. Referring to FIG. 17B, the DCI format according to an exemplary embodiment of the present invention and here designated as DCI format 1F_b, includes an MCS field 1711, a Downlink power offset field 1715, and other fields 1709. In distinction from DCI format 1D, DCI format 1F_b does not include a TPMI field and introduces a field regarding the index of the DRS (i_DRS) 1713 used in this transmission. The i_DRS field 1713 is similar to the i_DRS field illustrated as above with reference to proposed DCI formats 1E, 1F, and 1G. The bitwidth of the i_DRS field 1713 depends on the maximum number of DRSs allowed in MU-MIMO. This maximum allowed DRS number, denoted by M, is either fixed in the standard or signaled by the base station as a cell-specific value. Therefore, the bitwidth of the i_DRS field 1713 is $\lceil \log_2 M \rceil$.

Referring to FIG. 17B, the DCI format 1F_b is designed for supporting up to two MSs in MU-MIMO mode. More specifically, DCI format 1F_b uses the field of "Downlink Power Offset" found in DCI format 1D to also represent the total number of DRS used in the transmission. That is, the DCI format 1F_b uses the field of "Downlink Power Offset" to remove the necessity of using the N_DRS field in DCI Format 1F.

Table 1 illustrates use of the existing "Downlink Power Offset" field to indicate both the power offset and the number of DRSs in format 1F_b.

TABLE 1

| Downlink Power Offset field | Number of DRSs used in this sub-frame (N_DRS) | $\delta_{power\text{-}offset}$ [dB] |
|---|---|---|
| 0 | 2 | $-10\log_{10}(2)$ |
| 1 | 1 | 0 |

According to an exemplary implementation, the BS and MS behavior when using DCI format 1F_b remains substantially the same as when using DCI format 1F, except for the additional step that the BS and MS both use the "Downlink Power Offset" field to jointly indicate the number of DRS and the power offset.

More specifically, once an MS receives Downlink Power Offset and i_DRS, it determines an associated number of DRSs (i.e., N_DRS) used in the subframe based on the Downlink Power Offset value. The MS expects that the set of DRSs (i.e., DRS(1), DRS(2) . . . DRS(N_DRS)) is used for transmitting data to multiple users in this sub-frame. In addition, the MS expects DRS(i_DRS) is used as a reference signal to demodulate its own data. The MS also assumes that the DRS RE indicated by i_DRS is precoded using the same precoding vector as the data layer and can therefore be used as a demodulation pilot for the data layer.

Using the Downlink Power Offset field, the BS also determines an associated number of DRSs (i.e., N_DRS) used in the subframe based on the Downlink Power Offset value. Once the N_DRS is determined based on the Downlink Power Offset field, during an SA for MU-MIMO transmission, in terms of avoiding DRS REs in the data to RE mapping step of BS transmission, there are at least three alternatives.

In alternative 1, the BS transmits data on REs other than the sets of DRS REs indicated by (DRS(1), . . . , DRS (N_DRS)). At the MS, the MS will assume the BS data is mapped to the REs other than the set of DRS REs indicated by the set (DRS(1), . . . DRS(N_DRS)).

In alternative 2, similar to the actions regarding transmission of DCI format 1D, the BS transmits data on REs other than the set of DRS REs indicated by the index i_DRS. At the MS, the MS will assume the BS data is mapped to the REs other than the set of DRS REs indicated by the index i_DRS.

In alternative 3, the MS receives a cell-specific or MS-specific switch, configured by the BS using higher layers, denoted by DRS_region_switch. In this case, if DRS_region_switch=0, then the MS assumes that the BS data is mapped to the REs other than the set of DRS REs indicated by the set (DRS(1), . . . DRS(N_DRS)). On the other hand, if DRS_region_switch=1, then the MS assumes that the BS data is mapped to the REs other than the set of DRS REs indicated by the index DRS(i_DRS).

Fifth Exemplary Embodiment

In an exemplary embodiment of the present invention, an improved method for controlling downlink power is provided.

Section 5.2 of 3GPP TS 36.213 addresses downlink power allocation for physical layers in an evolved wireless communication system. This section is noted herein as providing background to assist in understanding exemplary aspects of the present invention.

As stated in section 5.2, the BS determines the downlink transmit energy per RE. An MS may assume that downlink cell-specific RS Energy Per Resource Element (EPRE) is constant across the downlink system bandwidth and constant across all sub-frames until different CRS power information is received. The downlink reference-signal EPRE can be derived from the downlink reference-signal transmit power given by the parameter Reference-Signal-Power provided by higher layers. The downlink reference-signal transmit power is defined as the linear average over the power contributions (in [W]) of all resource elements that carry CRSs within the operating system bandwidth.

The ratio of PDSCH EPRE to CRS EPRE among PDSCH REs (not applicable to PDSCH REs with zero EPRE) for each OFDM symbol is denoted by either $\rho_A$ or $\rho_B$ according to the OFDM symbol index as given by Table 5.2-2 [reproduced here as Table 2]. In addition, $\rho_A$ and $\rho_B$ are MS-specific.

TABLE 2

| | OFDM symbol indices within a slot where the ratio of the corresponding PDSCH EPRE to the CRS EPRE is denoted by $\rho_A$ | | OFDM symbol indices within a slot where the ratio of the corresponding PDSCH EPRE to the CRS EPRE is denoted by $\rho_B$ | |
|---|---|---|---|---|
| Number of Antenna Ports | Normal Cyclic Prefix | Extended Cyclic Prefix | Normal Cyclic Prefix | Extended Cyclic Prefix |
| One or Two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

The MS may assume that, for 16 Quadrature Amplitude Modulation (QAM), 64 QAM, spatial multiplexing with more than one layer, or for PDSCH transmissions associated with the MU-MIMO transmission scheme, $\rho_A$ is equal to $\delta_{power\text{-}offset}+P_A+10\log_{10}(2)$ [dB] when the MS receives a PDSCH data transmission using precoding for transmit diversity with 4 cell-specific antenna ports according to Section 6.3.4.3 of 3GPP TS 36.211, and $\rho_A$ is equal to $\delta_{power\text{-}offset}+P_A$ [dB] otherwise, where $\delta_{power\text{-}offset}$ is 0 dB for all PDSCH transmission schemes except MU-MIMO and where $P_A$ is an MS specific parameter provided by higher layers.

If DRSs are present in an RB, the ratio of PDSCH EPRE to DRS EPRE for each OFDM symbol is equal. In addition, the MS may assume that for 16QAM or 64QAM, this ratio is 0 dB.

The cell-specific ratio $\rho_B/\rho_A$ is given by Table 5.2-1 [reproduced here as Table 3] according to cell-specific parameter $P_B$ signaled by higher layers and the number of configured BS cell specific antenna ports.

TABLE 3

| | $\rho_B/\rho_A$ | |
|---|---|---|
| $P_B$ | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

For PMCH with 16QAM or 64QAM, the MS may assume that the ratio of PMCH EPRE to Multicast Broadcast Single Frequency Network (MBSFN) RS EPRE is equal to 0 dB.

Section 7.1.5 of 3GPP TS 36.213 addresses a procedure for receiving the PDSCH in a system using a MU-MIMO scheme.

As stated in section 7.1.5, for the multi-user MIMO transmission scheme of the PDSCH, the MS may assume that a BS transmission on the PDSCH would be performed on one layer and according to Section 6.3.4.2.1 of 3GPP TS 36.211. The $\delta_{power\text{-}offset}$ dB value signaled on PDCCH with DCI format 1D using the downlink power offset field is given in Table 7.1.5-1 (reproduced here as Table 4).

TABLE 4

| Downlink Power Offset field | $\delta_{power\text{-}offset}$ [dB] |
|---|---|
| 0 | $-10\log_{10}(2)$ |
| 1 | 0 |

As illustrated in the above discussion regarding sections 5.2 and 7.1.5 of 3GPP TS 36.213, the value of $\delta_{power\text{-}offset}$ is determined as either 0 or $-10\log_{10}(2)$ depending on the value of the "Downlink Power Offset" field. In the fifth exemplary embodiment of the present invention, an alternative method for determining the value of $\delta_{power\text{-}offset}$ is provided. More specifically, the value of $\delta_{power\text{-}offset}$ is determined as:

$$\delta_{power\text{-}offset}[\text{dB}]=-10\log_{10}(\text{N_DRS}) \quad \text{Eq. (1)}$$

In Equation (1), N_DRS indicates the total number of DRSs in the scheduled band. By using Eq. (1), the value of $\delta_{power\text{-}offset}$ will more accurately reflect situations in which there are three or more DRSs in a scheduled band. In an exemplary implementation, Eq. (1) may be used for any DCI format for MU-MIMO in which the total number of DRSs (which corresponds to total number of layers) is included. For example, Eq. (1) may be used with any of DCI format 1F, 1H, 2H, etc. where the field N_DRS or N_L is provided.

Sixth Exemplary Embodiment

In an exemplary embodiment of the present invention, a relationship for the power ratio between the data RE (per layer) and the DRS RE (per-layer), denoted as $\gamma$, is provided. As will be evidenced below, while the power ratio $\gamma$ is applicable to all modulations, it is particularly applicable for 16QAM and 64QAM modulations. Moreover, the power ratio $\gamma$ is applicable to both Single User (SU)-MIMO and MU-MIMO operations.

Figure 18:
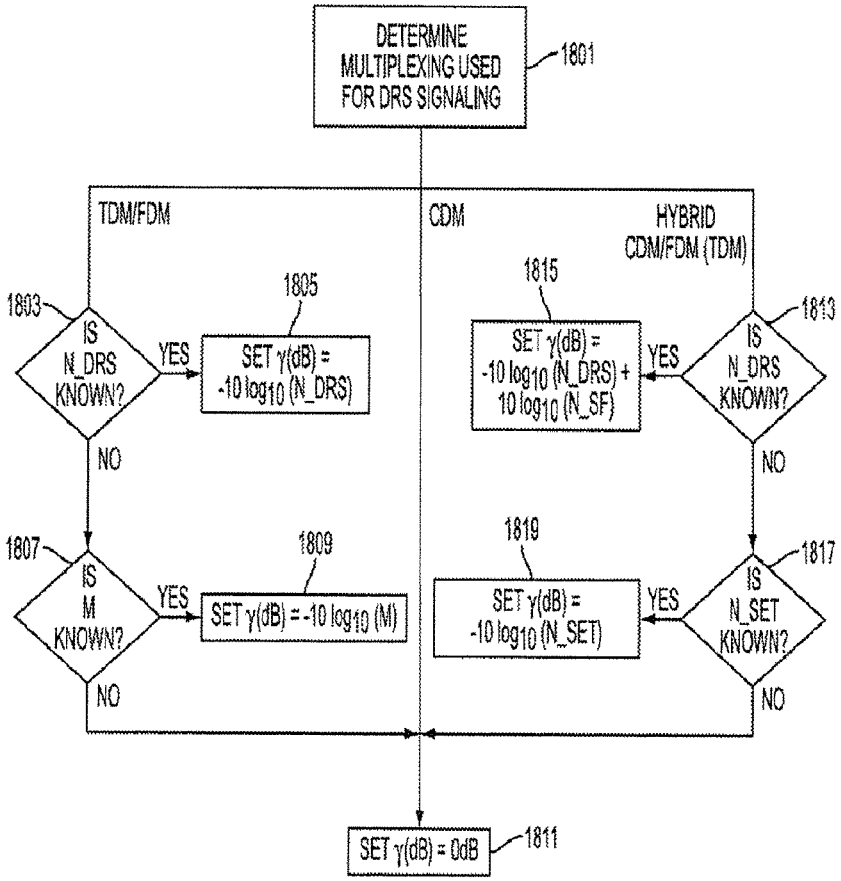
FIG. 18 is a flowchart illustrating a method of determining a power ratio $\gamma$ according to an exemplary embodiment of the present invention.

FIG. 18 is a flowchart illustrating a method of determining a power ratio $\gamma$ according to an exemplary embodiment of the present invention.

Referring to FIG. 18, in step 1801, the MS determines the multiplexing that is used for DRS signaling. That is, the MS determines if either TDM or FDM, CDM, or a hybrid of CDM with TDM or FDM is used. If it is determined in step 1801 that either TDM or FDM is used for DRS signaling, the MS proceeds to step 1803 and determines if N_DRS is known. That is, the MS determines if the field N_DRS is provided in signaling received from the BS. If the MS determines in step 1803 that the field N_DRS is known, then the MS proceeds to step 1805 and sets the power ratio $\gamma[dB]=-10\log_{10}(N_DRS)$. On the other hand, if the MS determines in step 1803 that the value of N_DRS is not known, then the MS proceeds to step 1807 and determines if M is known. That is, the MS determines if a value of M is provided from the BS in the DCI signaling or otherwise. If it is determined in step 1807 that the value of M is known, then the MS proceeds to step 1809 and sets the power ratio $\gamma[dB]=-10\log_{10}(M)$. Alternatively, if it is determined in step 1807 that the value of M is not known by the MS, the MS proceeds to step 1811 and sets the power ratio $\gamma[dB]=0$ dB. In an alternative exemplary implementation, the BS may set the power ratio of $\gamma[dB]=0$ dB despite that the values of N_DRS and M are known. In that case, the BS would provide information regarding the power ratio $\gamma[dB]=0$ dB to the MS.

If it is determined in step 1801 that DRS signaling is made using pure CDM, that is, all DRS are CDMed together in the same set of REs, then the MS proceeds to step 1811 and sets the power ratio $\gamma[dB]=0$ dB.

Lastly, if it is determined in step 1801 that DRS signaling is made using a hybrid of CDM and either FDM or TDM, for example as illustrated in FIG. 15, the MS proceeds to step 1813 and determines if N_DRS is known. That is, the MS determines if the field N_DRS is provided in signaling received from the BS. If it is determined in step 1813 that the value of N_DRS is known, the MS sets the power ratio $\gamma[dB]=-10\log_{10}(N_DRS)+10\log_{10}(N_SF)$, wherein N_SF is the Walsh code spreading length. On the other hand, if it is determined in step 1813 that the value of N_DRS is not known, the MS proceeds to step 1817 and determines if the value of N_SET is known. If the value of N_SET is known to the MS, the MS proceeds to step 1809 and sets the power ratio $\gamma[dB]=-10\log_{10}(N_SET)$, wherein N_SET is number of CDMed set as discussed above. On the other hand, if the value of N_SET is not known, the MS proceeds to step 1811 and sets the power ratio $\gamma[dB]=0$ dB. In an alternative exemplary implementation, the BS may set the power ratio of $\gamma[dB]=0$ dB despite that the values of N_DRS and N_SET are known. In that case, the BS would provide information regarding the power ratio $\gamma[dB]=0$ dB to the MS. In yet another exemplary implementation as illustrated below, for a transmission with odd rank, a combination of two equations can be used to determine the power ratio $\gamma[dB]$.

Figure 19A:
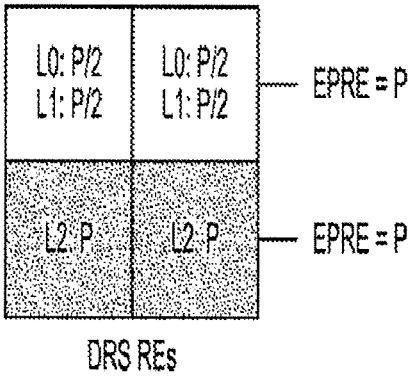
FIGS. 19A through 19C illustrate a combination of two downlink power control equations for a rank-3 transmission according to an exemplary embodiment of the present invention.
Figure 19B:
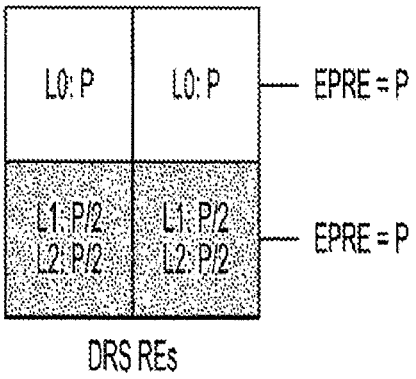
Figure 19C:
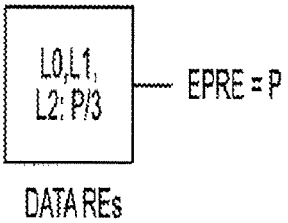

FIGS. 19A through 19C illustrate a combination of two downlink power control equations for a rank-3 transmission according to an exemplary embodiment of the present invention Referring to FIG. 19A, a first CDM DRS set that is allocated two layers (L0 and L1) and a second CDM DRS that is allocated one layer (L2) is illustrated. The use of different numbers of layers allows for different power assignments for the CDM DRS of each level which in turn allows for unequal error protection. For example, as illustrated in FIG. 19A, each layer (L0 and L1) of the first CDM DRS is allocated an EPRE value of P/2 whereas the layer (L2) of the second CDM DRS is allocated an EPRE value of P. In an exemplary implementation, the two layers (L0 and L1) of the first CDM DRS are allocated power according to the equation $\gamma[dB]=-10\log_{10}(N_DRS)+10\log_{10}(N_SF)$, whereas the single layer (L2) of the second CDM DRS set uses the equation $\gamma[dB]=-10\log_{10}(N_SET)$. As illustrated in FIG. 19B, a first CDM DRS may include a single layer (L0) which is allocated an EPRE of P, while a second CDM DRS may include two layers (L1 and L2) which are allocated an EPRE of P/2. Similarly to the example of FIG. 19A, the two layers (L1 and L2) of the second CDM DRS may be allocated power according to the equation $\gamma[dB]=-10\log_{10}(N_DRS)+10\log_{10}(N_SF)$, whereas the single layer (L)) of the first CDM DRS may use the equation $\gamma[dB]=-10\log_{10}(N_SET)$. Finally, as illustrated in FIG. 19C, a CDM DRS may be allocated three layers (L0, L1, and L2) such that each layer is allocated an EPRE value of P/3.

In addition, if either N_DRS or N_SET in the DCI format is also used for the purpose of indicting power offset, then the existing field "Downlink Power Offset" may be removed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

[1. A method for determining a power ratio of Resource Elements (REs) transmitted by a Mobile Station (MS), the method comprising:

determining a type of multiplexing used for multiplexing the Dedicated Reference Signals (DRS) REs;

if the type of multiplexing is determined to be one of Time Division Multiplexing (TDM) and Frequency Division Multiplexing (FDM), determining if the number of DRSs transmitted by the BS is known;

if the number of transmitted DRSs is known, setting the Physical Downlink Shared Channel (PDSCH) data to DRS power ratio to correspond to the number of transmitted DRSs; and if the number of transmitted DRSs is not known, determining if the maximum number of DRSs that may be transmitted is known;

if the maximum number of DRSs that may be transmitted is known:

setting the power ratio to correspond to a maximum number of DRSs that may be transmitted; and otherwise setting the power ratio to 0 dB.]

[2. The method of claim 1, wherein the setting of the power ratio to correspond to the number of transmitted DRSs comprises using the equation:

$$\gamma[dB]=-10\log_{10}(N_DRS),$$

where $\gamma[dB]$ comprises the power ratio and N_DRS comprises the number of transmitted DRSs.]

[3. The method of claim 1, wherein the setting of the power ratio to correspond to the maximum number of DRSs that may be transmitted comprises using the equation:

$$\gamma[dB]=-10\log_{10}(M),$$

where $\gamma[dB]$ comprises the power ratio and M comprises the maximum number of DRSs that may be transmitted.]

[4. The method of claim 1, wherein, if the type of modulation is determined to be Code Division Multiplexing (CDM), setting the power ratio to 0 dB.]

[5. A method for determining a power ratio of Resource Elements (REs) transmitted by a Mobile Station (MS), the method comprising:

determining a type of multiplexing used for multiplexing Dedicated Reference Signal (DRS) REs;

if the type of multiplexing is determined to be one of Time Division Multiplexing (TDM) and Frequency Division Multiplexing (FDM), determining if the number of DRSs transmitted by a Base Station (BS) is known;

if the number of transmitted DRSs is known, setting Physical Downlink Shared Chanel (PDSCH) data to DRS power ratio to correspond to the number of transmitted DRSs;

if the number of transmitted DRSs is not known, determining if the maximum number of DRSs that may be transmitted is known;

if the type of multiplexing is determined to be a hybrid of CDM and one of FDM and TDM, determining if the number of DRSs transmitted by the BS is known; and if the number of transmitted DRSs is known, setting the power ratio to correspond to the number of transmitted DRSs and a spreading length used for the CDM.]

[6. The method of claim 5, wherein, if the total number of DRS sets that are transmitted is known:

setting the power ratio to correspond to the total number of DRS sets that are transmitted; and otherwise setting the power ratio to 0 dB.]

[7. The method of claim 6, wherein the setting of the power ratio to correspond to the number of transmitted DRSs and a spreading length used for the CDM comprises using the equation:

$$\gamma[\mathrm{dB}]=-10\log_{10}(\mathrm{N_DRS})+10\log_{10}(\mathrm{N_SF}),$$

where γ[dB] comprises the power ratio, N_DRS comprises the number of transmitted DRSs, and N_SF comprises the spreading length used for the CDM.]

[8. The method of claim 5, wherein, if the type of multiplexing is determined to be a hybrid of CDM and one of FDM and TDM, determining if the number of CDMed DRS sets and the number of DRSs transmitted by the BS are known, and determining if the number of total transmission layers is an odd number and that is greater than 1; and if the number of total transmission layers is an odd number and the transmission layers are split into two CDMed DRS sets, applying different power ratios to the layers in the two CDMed DRS sets.]

[9. The method of claim 8, wherein, if it is determined that three transmission layers are split into two CDMed DRS sets, applying the power ratio to the set with 2 layers as:

$$\gamma[\mathrm{dB}]=-10\log_{10}(\mathrm{N_DRS})+10\log_{10}(\mathrm{N_SF}),$$

and applying the power ratio to the set with 1 layer as:

$$\gamma[\mathrm{dB}]=10\log_{10}(\mathrm{N_SET}).]$$

[10. A method for determining a power ratio of Resource Elements (REs) transmitted by a Mobile Station (MS), the method comprising:

determining a type of multiplexing used for multiplexing Dedicated Reference Signal (DRS) REs;

if the type of multiplexing is determined to be one of Time Division Multiplexing (TDM) and Frequency Division Multiplexing (FDM), determining if the number of DRSs transmitted by a Base Station (BS) is known;

if the number of transmitted DRSs is known, setting Physical Downlink Shared Chanel (PDSCH) data to DRS power ratio to correspond to the number of transmitted DRSs;

if the number of transmitted DRSs is not known, determining if the maximum number of DRSs that may be transmitted is known;

if the type of multiplexing is determined to be a hybrid of CDM and one of FDM and TDM, determining if the number of CDMed DRS sets transmitted by the BS is known; and if the number of CDMed DRS sets is known, setting the power ratio to correspond to the number of CDMed DRS sets.]

[11. The method of claim 10, wherein the setting of the power ratio to correspond to the total number of DRS sets that are transmitted comprises using the equation:

$$\gamma[\mathrm{dB}]=-10\log_{10}(\mathrm{N_SET}),$$

where γ[dB] comprises the power ratio and N_SET comprises the total number of DRS sets that are transmitted.]

*12. A method for transmitting a signal in a communication system, the method comprising:*

*determining a ratio of physical downlink shared channel (PDSCH) energy per resource element (EPRE) to mobile specific reference signal EPRE based on a number of layers;*

*transmitting downlink control information including Hybrid Automatic Repeat reQuest (HARQ) information, mobile specific reference signal information* associated with a number of the mobile specific reference signal(s), *modulation and coding scheme information per a transport block, and new data indicator information per the transport block; and*

*transmitting data on the PDSCH according to the determined ratio and based on the downlink control information.*

*13. The method of claim 12, wherein the number of layers is equal to a number of mobile specific reference signals.*

*14. The method of claim 12, wherein indices of mobile specific reference signals indicated by the mobile specific reference signal information are consecutive.*

*15. The method of claim 12, wherein an $L^{th}$ layer is associated with an index of mobile specific reference signal, i_DRS+L−1.*

*16. The method of claim 12, wherein a mobile specific reference signal is defined by applying code division multiplexing and frequency division multiplexing.*

*17. The method of claim 12, wherein the data is mapped onto resource elements other than cell specific reference signal resource elements and mobile specific reference signal resource elements.*

*18. An apparatus for transmitting a signal in a communication system, the apparatus comprising:*

*control circuitry configured to determine a ratio of physical downlink shared channel (PDSCH) energy per resource element (EPRE) to mobile specific reference signal EPRE based on a number of layers; and*

*a transmitter configured to transmit downlink control information including Hybrid Automatic Repeat reQuest (HARQ) information, mobile specific reference signal information* associated with a number of the mobile specific reference signal(s), *modulation and coding scheme information per a transport block, new data indicator information per the transport block, and to transmit data on the PDSCH according to the determined ratio and based on the downlink control information.*

*19. The apparatus of claim 18, wherein the number of layers is equal to a number of mobile specific reference signals.*

*20. The apparatus of claim 18, wherein indices of multiple mobile specific reference signals indicated by the mobile specific reference signal information are consecutive.*

*21. The apparatus of claim 18, wherein a $L^{th}$ layer is associated with an index of mobile specific reference signal, i_DRS+L−1.*

*22. The apparatus of claim 18, wherein a mobile specific reference signal is defined by applying code division multiplexing and frequency division multiplexing.*

*23. The apparatus of claim 18, wherein the data is mapped onto resource elements other than cell specific reference signal resource elements and mobile specific reference signal resource elements.*

*24. A method for receiving a signal in a communication system, the method comprising:*

*receiving downlink control information including Hybrid Automatic Repeat reQuest (HARQ) information, mobile specific reference signal information* associated with a number of the mobile specific reference signal(s), *modulation and coding scheme information per a transport block, new data indicator information per the transport block;*

*obtaining a ratio of physical downlink shared channel (PDSCH) energy per resource element (EPRE) to mobile specific reference signal EPRE based on a number of layers; and*

*receiving data that has been transmitted on the PDSCH according to the obtained ratio and based on the downlink control information.*

*25. The method of claim 24, wherein the number of layers is equal to a number of mobile specific reference signals.*

*26. The method of claim 24, wherein indices of mobile specific reference signals indicated by the mobile specific reference signal information are consecutive.*

*27. The method of claim 24, wherein an $L^{th}$ layer is associated with an index of mobile specific reference signal, i_DRS+L−1.*

*28. The method of claim 24, wherein a mobile specific reference signal is defined by applying code division multiplexing and frequency division multiplexing.*

*29. The method of claim 24 wherein the data is mapped onto resource elements other than cell specific reference signal resource elements and mobile specific reference signal resource elements.*

*30. An apparatus for receiving a signal in a communication system, the apparatus comprising:*

*a receiver configured to receive downlink control information including Hybrid Automatic Repeat reQuest (HARQ) information, mobile specific reference signal information* associated with a number of the mobile specific reference signal(s), *modulation and coding scheme information per a transport block, new data indicator information per the transport block; and*

*control circuitry configured to obtain a ratio of physical downlink shared channel (PDSCH) energy per resource element (EPRE) to mobile specific reference signals (RSs) based on a number of layers,*

*wherein the receiver is configured to receive data that has been transmitted on the PDSCH according to the obtained ratio and based on the downlink control information.*

*31. The apparatus of claim 30, wherein the number of layers is equal to a number of mobile specific reference signals.*

*32. The apparatus of claim 30, wherein indices of multiple mobile specific reference signals indicated by the mobile specific reference signal information are consecutive.*

*33. The apparatus of claim 30, wherein a $L^{th}$ layer is associated with an index of mobile specific reference signal, i_DRS+L−1.*

*34. The apparatus of claim 30, wherein a mobile specific reference signal is defined by applying code division multiplexing and frequency division multiplexing.*

*35. The apparatus of claim 30, wherein the data is mapped onto resource elements other than cell specific reference signal resource elements and mobile specific reference signal resource elements.*

* * * * *